United States Patent Office 2,702,294
Patented Feb. 15, 1955

2,702,294

VAT DYESTUFFS AND PROCESS OF MAKING SAME

Maurice Grelat, Basel, and Walter Kern, Sissach, Switzerland, assignors to Ciba Limited, Basel, Switzerland, a Swiss firm No Drawing. Application May 14, 1951,
Serial No. 226,272

Claims priority, application Switzerland May 26, 1950

4 Claims. (Cl. 260—316)

The present invention is based on the observation that a valuable vat dyestuff is obtained by subjecting the compound of the formula

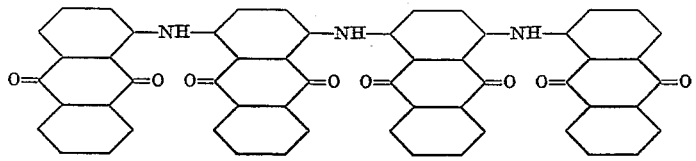

to carbazolization by means of aluminum chloride with the addition of a tertiary base free from hydroxyl groups.

The compound of the above formula used as starting material in the process of this invention may be made by causing 1 molecular proportion of commercial 4:4'-diamino-1:1'-dianthrimide and 2 molecular proportions of 1-chloranthraquinone or a 4-halogen-1:1'-dianthrimide and 4-amino-1:1'-dianthrimide or a 1-halogen-anthraquinone and 4-amino-1:1'-4':1''-trianthrimide to react in a high boiling solvent, such as nitrobenzene, with the addition of an acid binding agent and a catalytic quantity of a copper salt or copper powder.

As an example of a suitable tertiary base for use in the present process there may be mentioned triethylamine. However, especially suitable are cyclic tertiary bases such, for example, as quinoline or acridine, and above all pyridine bases such as pyridine itself and its nearest homologues, for example, methyl pyridines such as α-picoline or mixtures of pyridine bases such as the commercial mixture of β- and γ-picoline.

The heating of the tetranthrimide with aluminum chloride and the tertiary base can be conducted with advantage at a temperature ranging from about 120–180° C. When pyridine-aluminum chloride mixtures are used a temperature of about 140° C. is especially advantageous, while, for example, the picolines enable the reaction to be carried out at higher temperatures up to about 180° C. Depending on the choice of the base and the reaction temperature slight differences may occur in the properties of the product obtained, for example, with respect to the tint of the vat dyeings produced therewith.

The reaction mixtures may be worked up in the usual manner, for example, by rendering it alkaline with an alkali hydroxide after dilution with water, and vatting the resulting dyestuff by the addition of a suitable reducing agent such as sodium hydrosulfite, and then precipitating it by oxidation, for example, with air.

The dyestuffs so obtained may be used as a pigment or for dyeing or printing a very wide variety of materials, and especially cellulose fibers such as cotton, linen, artificial silk and staple fibers of the regenerated cellulose, either as such or in the form of a leuco-ester salt obtainable therefrom in known manner. The dyeings and prints possess valuable brownish grey tints and also excellent properties of fastness, especially good fastness to kier boiling and to chlorine.

The following examples illustrate the invention, the parts and percentages being by weight unless otherwise stated and the relationship of parts by weight to parts by volume being the same as that of the kilogram to the liter:

Example 1

25 parts of aluminum chloride are introduced at 10–60° C. into 60 parts of anhydrous pyridine while stirring. The whole is heated at 100° C. and 5 parts of 1:1'-4':1''-4'':1'''-tetranthrimide are then added. In the course of 45 minutes the temperature is raised to 139–141° C. About 25 parts of pyridine distil off. The whole is stirred for 1 hour at 140° C. and the reaction mixture is poured into 1000 parts of cold water. To the resulting suspension are added 120 parts of sodium hydroxide solution of 30 per cent. strength and the whole is heated while stirring to 50° C. 5 parts of sodium hydrosulfite of 85 per cent. strength are then added, the whole is stirred at 16° C. for 15 minutes, and a small amount of residual matter is separated by filtering with suction. The filtrate is blown with air, and the precipitated dyestuff is separated by filtering with suction, washed and dried. It is a dark powder which dissolves in concentrated sulfuric acid with a brown-black coloration and dyes cotton from a brown vat fast brown-grey tints.

The 1:1'-4':1''-4'':1'''-tetranthrimide used above may be prepared, for example, as follows:

4.63 parts of 4-chloro-1:1'-dianthrimide, 4.44 parts of 4-amino-1:1'-dianthrimide, 150 parts of nitrobenzene, 1.5 parts of sodium carbonate and 0.2 part of cuprous chloride are heated for 8–9 hours at 200–205° C. while stirring. The whole is allowed to cool to 80–90° C., filtered with suction and the filter residue is washed with nitrobenzene and then with alcohol. The crude product is extracted at the boil with 500 parts of hydrochloric acid of 2 per cent. strength, separated by filtering with suction and washed until the washings are neutral. A violet powder is obtained which dissolves in concentrated sulfuric acid with a green coloration.

4-chloro-1:1'-dianthrimide, which is also not described in the literature, may be prepared as follows:

88.8 parts of 4-amino-1:1'-dianthrimide are dissolved in 900 parts of concentrated sulfuric acid. 28 parts of finely pulverized sodium nitrite are added in the course of 1 hour and the whole is stirred for 5 hours at room temperature. The reaction mixture is poured on to 2000 parts of ice, and the precipitated product is separated by filtering with suction and washed with 3000 parts of water. The moist filter cake is pasted with 1000 parts of hydrochloric acid of 10 per cent. strength, and slowly introduced into a solution of 30 parts of cuprous chloride in 500 parts of concentrated hydrochloric acid. The whole is stirred for 2 hours at room temperature, filtered with suction, and the filter residue is washed until the washings are neutral. The resulting 4-chloro-1:1'-dianthrimide is a dark red powder which dissolves in concentrated sulfuric acid with a green coloration.

An alternative method to that described above for preparing 1:1'-4':1''-4'':1'''-tetranthrimide is as follows:

6.66 parts of 4-amino-1:1'-4':1''-trianthrimide, 2.42 parts of 1-chloranthraquinone, 1.5 parts of sodium carbonate, 0.2 part of cuprous chloride and 200 parts of nitrobenzene are maintained at 200–210° C. for 10 hours while stirring. The whole is allowed to cool to about 70° C., filtered with suction, and the filter residue is washed first with nitrobenzene and then with alcohol. The crude product is extracted at the boil with dilute hydrochloric acid, filtered with suction, and the filter residue is washed until the washings are neutral. A violet powder is obtained which dissolves in concentrated sulfuric acid with a green coloration.

The 4-amino-1:1'-4':1''-trianthrimide, which has not hitherto been described in the literature may be prepared as follows:

7.1 parts of 4-chloro-1:1'-dianthrimide, 4 parts of 1-amino-4-nitro-anthraquinone, 2 parts of sodium carbonate, 0.3 part of cuprous chloride and 100 parts of nitrobenzene are heated to 200° C. in the course of 2 hours and stirred at that temperature for 6 hours. The whole is filtered with suction at 50° C., and the filter residue is washed with nitrobenzene and then with alcohol. The resulting 4-nitro-1:1'-4':1''-trianthrimide is a dark brown powder, and is reduced in suspension in alcohol with an aqueous solution of sodium sulfide at 85–90° C. The resulting 4-amino-1:1'-4':1''-trianthrimide is a dark blue powder.

*Example 2*

50 parts of aluminum chloride are introduced at 10–60° C., while stirring, into 100 parts of anhydrous triethylamine. The whole is heated to 100° C. and then 10 parts of 1:1'-4':1''-4'':1'''-tetranthrimide are then added. In the course of 40 minutes the temperature is raised to 140° C. with the simultaneous distillation of the excess of triethylamine. The whole is stirred for 1 hour at 140° C. and the reaction mixture is poured into 1000 parts of cold water. The suspension is mixed with 100 parts of hydrochloric acid of 35 per cent. strength, and the dyestuff is separated by filtering with suction, washed neutral and dried. It is a dark powder which dyes cotton somewhat more reddish grey tints than the dyestuff obtained as described in the first paragraph of Example 1.

*Example 3*

50 parts of aluminum chloride are introduced while stirring at 20–80° C. into 125 parts of a α-picoline. The whole is heated to 100° C. and then 10 parts of 1:1'-4':1''-4'':1'''-tetranthrimide are then added. In the course of 40 minutes the temperature is raised to 140° C. with the simultaneous distillation of the excess of α-picoline. The whole is stirred for 1 hour at 140° C., and the reaction mixture is poured on to 2000 parts of ice. 300 parts of sodium hydroxide solution of 30 per cent. strength are added to the resulting suspension, the whole is stirred for a short time and filtered with suction, and the filter residue is washed neutral and dried. The dyestuff is a dark powder which has properties similar to those of the dyestuff of Example 1.

*Example 4*

50 parts of aluminum chloride are introduced at 20–80° C., while stirring, into 80 parts of a commercial mixture of β- and γ-picoline containing a small amount of dimethyl-pyridine. The whole is heated to 100° C. and then 10 parts of 1:1'-4':1''-4'':1'''-tetranthrimide are added. In the course of 45 minutes the temperature is raised to 140° C. The whole is stirred for 1 hour at 140° C. and the reaction mixture is poured on to 2000 parts of ice. 300 parts of sodium hydroxide solution of 30 per cent. strength are added, and the dyestuff is separated by filtering with suction, washed neutral and dried. It is a dark powder which dissolves in concentrated sulfuric acid with a brown-black coloration and dyes cotton from a brown vat fast grey tints.

*Example 5*

1.5 parts of the dyestuff obtained as described in the first paragraph of Example 1 are vatted at 40–50° C. in 100 parts of water with 6 parts by volume of sodium hydroxide of 30 per cent. strength and 3 parts of sodium hydrosulfite. The resulting stock vat is added to a dyebath containing in 2000 parts of water 6 parts by volume of sodium hydroxide solution of 30 per cent. strength and 3 parts of sodium hydrosulfite, and 100 parts of cotton are entered at 40° C. After 15 minutes 20 parts of sodium chloride are added, and dyeing is carried on at 40–50° C. for 1 hour. The cotton is then squeezed, oxidized and finished in the usual manner. It is dyed a fast brownish grey tint.

What is claimed is:
1. A vat dyestuff which has been obtained by subjecting the compound of the formula

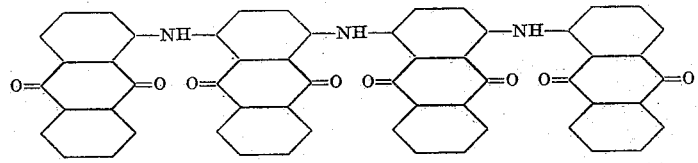

to carbazolization by means of aluminum chloride with the addition of an organic tertiary base selected from the group consisting of pyridine and a mixture of β-picoline and γ-picoline at a temperature ranging from 120 to 180° C.

2. Process for the manufacture of a vat dyestuff which comprises subjecting the compound of the formula

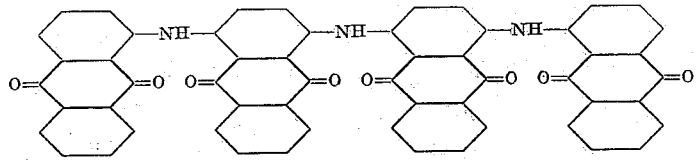

to carbazolization by means of aluminum chloride with the addition of pyridine at a temperature ranging from 120 to 180° C.

3. Process for the manufacture of a vat dyestuff which comprises subjecting the compound of the formula

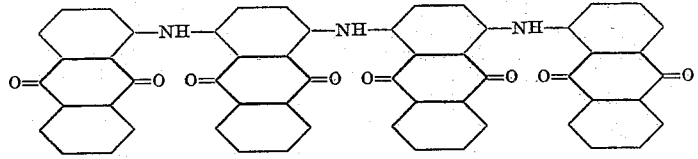

to carbazolization by means of aluminum chloride with the addition of a methyl-pyridine free from hydroxyl groups at a temperature ranging from 120 to 180° C.

4. Process for the manufacture of a vat dyestuff which comprises subjecting the compound of the formula

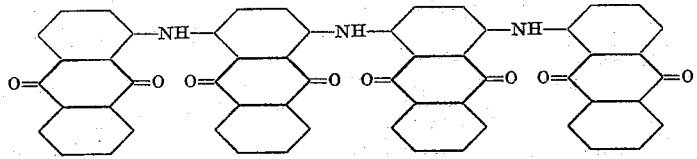

to carbazolization by means of aluminum chloride with the addition of a mixture of β- and γ-picoline at a temperature ranging from 120 to 180° C.

References Cited in the file of this patent

UNITED STATES PATENTS

| | | |
|---|---|---|
| 2,385,113 | Smyth | Sept. 18, 1945 |
| 2,420,022 | Tinker | May 6, 1947 |

FOREIGN PATENTS

| | | |
|---|---|---|
| 789,570 | France | Oct. 31, 1935 |